(12) United States Patent  
McCarthy et al.

(10) Patent No.: US 7,903,669 B2
(45) Date of Patent: Mar. 8, 2011

(54) ENFORCED ROUTING IN SWITCHED NETWORK FOR FRU VERIFICATION

(75) Inventors: Timothy F. McCarthy, Eastleigh (GB); Roderick G. C. Moore, Dorset (GB); Jonathan I. Settle, Southampton (GB); Jonathan W. L. Short, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 12/244,252

(22) Filed: Oct. 2, 2008

(65) Prior Publication Data

US 2010/0086298 A1   Apr. 8, 2010

(51) Int. Cl.
*H04L 12/28* (2006.01)
*H04L 12/56* (2006.01)
*H04L 1/00* (2006.01)
*H04L 12/26* (2006.01)

(52) U.S. Cl. ......... 370/400; 370/217; 370/236; 370/244; 370/248

(58) Field of Classification Search .................. 370/217, 370/235, 236, 242, 244, 248, 400
See application file for complete search history.

(56) References Cited

U.S. PATENT DOCUMENTS

| | | |
|---|---|---|
| 6,904,544 B2 | 6/2005 | DeRolf et al. |
| 7,155,636 B2 | 12/2006 | Nagata |
| 7,181,647 B2 | 2/2007 | Dawson et al. |
| 2006/0182110 A1* | 8/2006 | Bomhoff et al. ............. 370/392 |

* cited by examiner

*Primary Examiner* — Ronald Abelson
(74) *Attorney, Agent, or Firm* — Randall Bluestone; Roberts Mlotkowski Safran & Cole, P.C.

(57) ABSTRACT

A method implemented in a computer infrastructure having computer executable code having programming instructions tangibly embodied on a computer readable medium. The programming instructions are operable to configure an initiator-to-initiator message route in a switched fiber channel arbitrated loop (FCAL) network such that the initiator-to-initiator message route traverses a replacement field replaceable unit (FRU). Additionally, the programming instructions are operable to transmit a verification initiator-to-initiator message along the initiator-to-initiator message route to verify proper operation of the replacement FRU.

20 Claims, 8 Drawing Sheets

ENFORCED ROUTING IN SWITCHED NETWORK FOR FRU VERIFICATION

CROSS REFERENCE TO RELATED APPLICATION

This application is related to U.S. patent application Ser. No. 12/244,038 filed Oct. 2, 2008, the contents of which are incorporated herein by reference in their entirety.

FIELD OF THE INVENTION

The present invention generally relates to switched networks, and more particularly, to a method and system for enforced routing in a switched network for field replaceable unit (FRU) verification.

BACKGROUND

In a fully switched network, hubs that would usually reside, for example, on an Ethernet network are replaced with one or more switches. These switches allow for a dedicated connection to, e.g., each workstation. A switch allows for many conversations to occur simultaneously. Before switches existed data could only be transmitted in one direction at a time, which was called half-duplex. However, by using a switch, a network is able to maintain a full -duplex Ethernet, wherein data can now be transmitted in both directions at the same time.

A function of a switch is to allow each workstation to communicate only with the switch instead of the workstations communicating with each other. With a fully switched network, data can be sent, for example, from workstation to switch and from switch to workstation simultaneously. Moreover, a switch is able to decongest network flow to the workstations so that the connections can transmit more effectively, for example, by receiving transmissions that were only specific to their network address. By using switches to transmit data in both directions simultaneously, network speed and capacity may be doubled when, for example, two workstations are trading information. That is, for example, if a network speed is 5 Mbit/s, then each workstation is able to simultaneously transfer data at 5 Mbit/s.

Fully switched networks employ, for example, twisted-pair or fiber-optic cabling, both of which use separate conductors for sending and receiving data. In this type of environment, Ethernet nodes can forego the collision detection process and transmit at will, since they are the only potential devices that can access the medium. As such, a fully switched network may be thought of as a collision-free environment.

Fibre Channel (FC) is a gigabit-speed network technology used for storage networking. There are three major FC topologies, describing how a number of ports are connected together. It should be understood that a port in FC terminology may be any entity that actively communicates over the network, and not necessarily a hardware port. This port may be implemented in a device such as, for example, a disk storage, a host bus adaptor (HBA) on a server, or a Fibre Channel switch.

A Point-to-Point (FC-P2P) is a first FC topology. With FC-P2P, two devices are connected back to back. This is the simplest FC topology, with limited connectivity. With a fiber channel switched fabric (FC-SW), all devices or loops of devices are connected to Fibre Channel switches, similar conceptually to modern Ethernet implementations. Advantages of FC-SW topology over FC-P2P or FCAL (described below) include: the switches manage the state of the fabric, providing optimized interconnections; multiple pairs of ports may communicate simultaneously; and/or failure of a port is isolated and should not affect operation of other ports.

With a fiber channel arbitrated loop (FCAL), all devices are in a loop or ring, similar to token ring networking. Adding or removing a device from the loop causes all activity on the loop to be interrupted. Moreover, the failure of one device causes a break in the ring. Fibre Channel hubs connect multiple devices together and may bypass failed ports. A loop may also be made by cabling each port to the next in a ring. As such, with FCAL topology, messages, for example, initiator-to-initiator messages, are transmitted over all the links that make up that loop. Additionally, for example, a fully switched network may be implemented with an FCAL to provide a switched FCAL network.

A field replaceable unit (FRU) may be, for example, a circuit board, part or assembly that can be quickly and easily removed from a personal computer or other piece of electronic equipment, and replaced by the user or a technician without having to send the entire product or system to a repair facility. That is, a system may include a number of FRUs, any one of which may need repair and/or replacement service throughout the use of the system. For example, an FRU, e.g., a network storage device component, may be in need for repair and/or replacement. A technician may, for example, arrive at a data center where the damaged network storage device component is located and swap out the damaged FRU for a replacement FRU, e.g., network storage device component.

After this service action that is intended to fix a problem with, for example, a back end switched storage network, a verification of the service action should be performed. For example, a verification should determine whether the replacement field replaceable unit (FRU) fixed the original problem. Additionally, the verification should determine whether the replacement FRU is a fully functional unit to use as a replacement.

However, verification may be difficult, particularly without risking customer I/O down an unverified path. That is, as explained above, with an FCAL topology, messages are transmitted over all the links that make up that loop. Thus, at present when a service action performed on a specific loop, this loop is placed into a logical "service mode". In this mode the I/O is not routed down this path. This allows an engineer to remove or replace components in this loop without risking customer data. However, with this approach, utilization of the specific loop including, for example, all of the connected network storage devices, is interrupted while service and testing is performed.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable medium having programming instructions. The programming instructions are operable to configure an initiator-to -initiator message route in a switched fibre channel arbitrated loop (FCAL) network such that the initiator-to-initiator message route traverses a replacement field replaceable unit (FRU). Additionally, the programming instructions are operable to transmit a verification initiator-to -initiator message along the initiator-to-initiator message route to verify proper operation of the replacement FRU.

In another aspect of the invention, a system comprises a routing tool operable to configure an initiator-to-initiator message route in a switched fibre channel arbitrated loop (FCAL) network such that the initiator-to-initiator message route traverses a replacement field replaceable unit (FRU). Additionally, the routing tool is operable to instruct an initiator to transmit a verification initiator-to-initiator message along the initiator-to-initiator message route to verify proper operation of the replacement FRU.

In an additional aspect of the invention, a computer program product comprising a computer usable medium having readable program code embodied in the medium is provided. The computer program product includes at least one component operable to configure an initiator-to-initiator message route in a switched fibre channel arbitrated loop (FCAL) network such that the initiator-to-initiator message route traverses a replacement field replaceable unit (FRU). Additionally, the at least one component is further operable to transmit a verification initiator-to-initiator message along the initiator-to-initiator message route to verify proper operation of the replacement FRU. Further, the at least one component is further operable to output a signal indicative of at least one of proper operation of the replacement FRU and improper operation of the replacement FRU.

In a further aspect of the invention, a method comprises providing a computer infrastructure operable to configure an initiator-to-initiator message route in a switched fibre channel arbitrated loop (FCAL) network such that the initiator-to-initiator message route traverses a replacement field replaceable unit (FRU). Additionally, the computer infrastructure is operable to transmit a verification initiator-to-initiator message along the initiator-to -initiator message route to verify proper operation of the replacement FRU.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
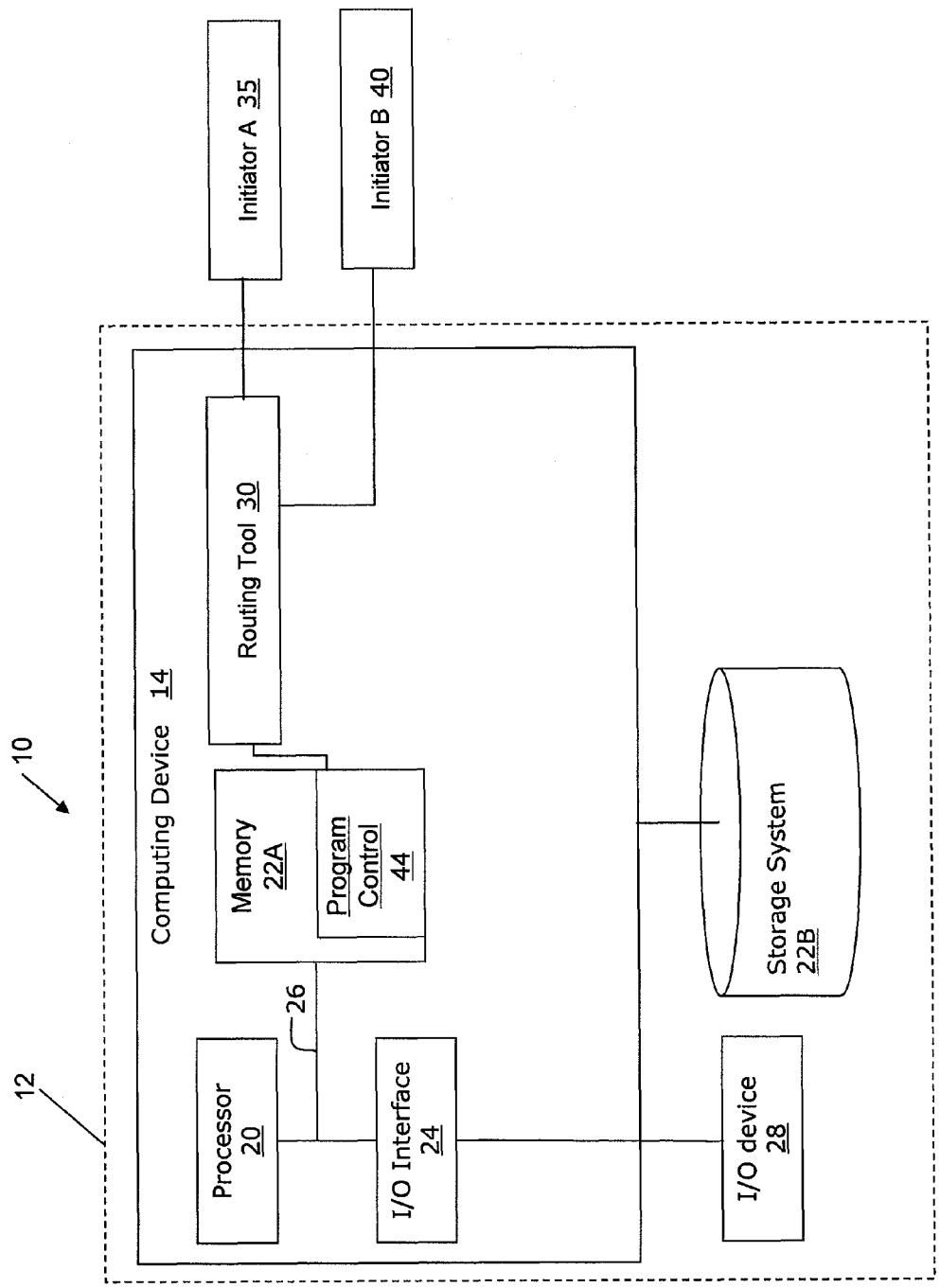
FIG. 1 shows an illustrative environment for implementing the steps in accordance with the invention.

The present invention generally relates to switched networks, and more particularly, to a method and system for enforced routing in a switched network for field replaceable unit (FRU) verification. For example, a verification signal may be routed down an enforced path in a switched network, e.g., to the location where a FRU replacement has occurred, to perform an FRU verification.

By implementing the present invention, for example, an FRU verification on a switched network may be performed without risking, e.g., customer I/O down an unverified path. Moreover, implementing the present invention allows service, e.g., replacement of an FRU, to be performed on FCAL network without placing the entire loop into a logical "service mode". Thus, utilization of an entire FCAL network is not interrupted while service and testing is performed on a portion of the FCAL network using the enforced routing.

In a switched FCAL network, messages, e.g., initiator-to-initiator messages, do not traverse the whole network. That is, the shortest route is taken, which is, for example, one hop into a switch and then to the initiator. Additionally, in a switched FCAL topology, messages between initiators take the shortest route and do not traverse the entire network or, for example, all the cascaded switches.

However, this shortest-route approach to initiator-to-initiator message implementation, limits a function of the initiator-to-initiator message capability. That is, an initiator-to -initiator message may only detect any issue in the underlying network infrastructure, if the message traverses the all of the links in the network. With the shortest-route approach, however, all the links of the network are not traversed and thus, this approach cannot detect all issues in the underlying network infrastructure.

In accordance with aspects of the present invention, using enforced routing for initiator-to -initiator traffic, verification of specific routes in a switched network can be designated. Moreover, using the enforcement of specific routes in a switched network, e.g., specifying a verification message to a particular network location where an FRU replacement has occurred, an FRU replacement may be verified. That is, for example, a verification of whether the replacement field replaceable unit (FRU) fixed the original problem and/or whether the replacement FRU is a fully functional unit to use as a replacement. The following is based upon a switched FCAL disk storage network in the DS8000 storage system, but the invention contemplates that the system could be extended to any switched storage subsystem. (DS800 is a trademark of International Business Machines Corporation in the United States, other countries, or both.)

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM), a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer -usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a routing tool 30. The routing tool 30 is operable to configure an initiator to define and enforce a particular route for an initiator-to-initiator message, e.g., the processes described herein. The routing tool 30 is in communication with initiator A 35 and initiator B 40 as explained further below. The routing tool 30 can be implemented as one or more program code stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 directs the routing tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Figure 2:
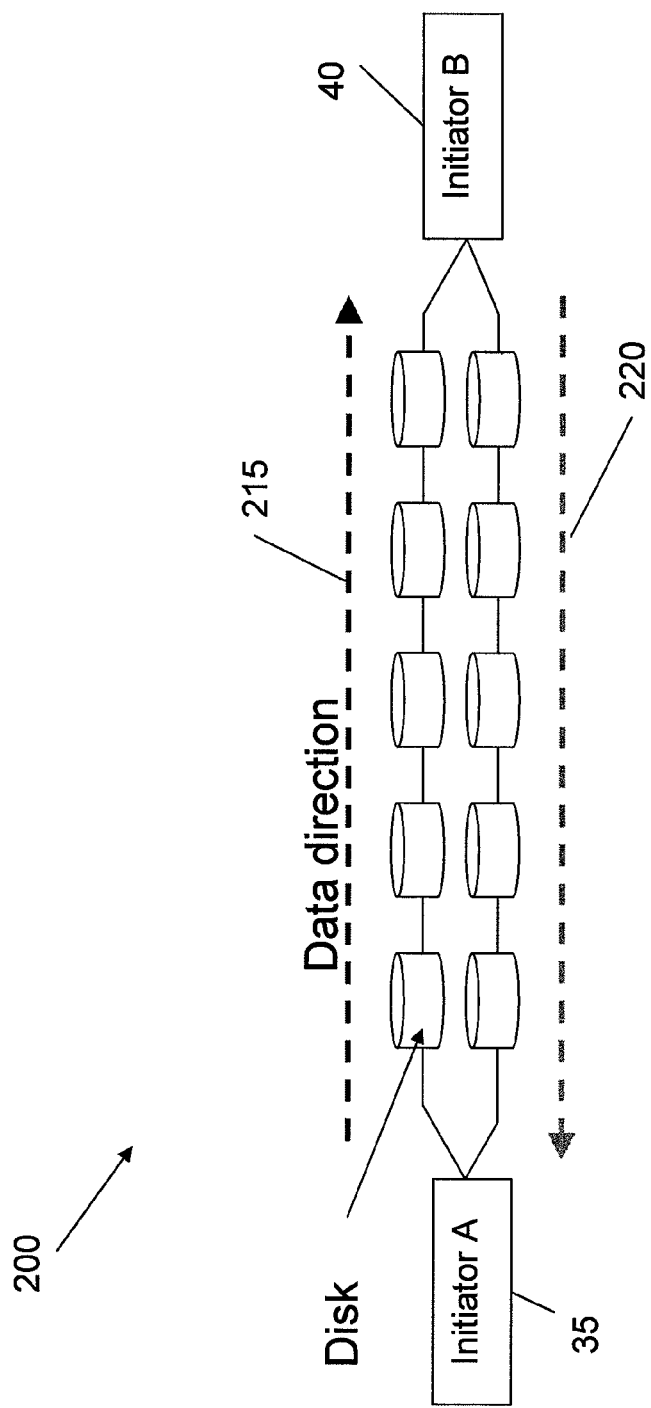
FIG. 2 shows an exemplary non-switched FCAL topology.

FIG. 2 shows an exemplary non-switched FCAL topology 200. As described above, with an FCAL topology, messages, for example, initiator-to-initiator messages, are transmitted over all the links that make up that loop. That is, for example, a ping between initiator A 35 and initiator B 40 traverses the entire loop. More specifically, a ping from initiator A 35 travels to initiator B 40 along data direction 215 and travels back to initiator A 35 from initiator B 40 along data direction 220, thus traversing each disk in the loop.

Figure 3:
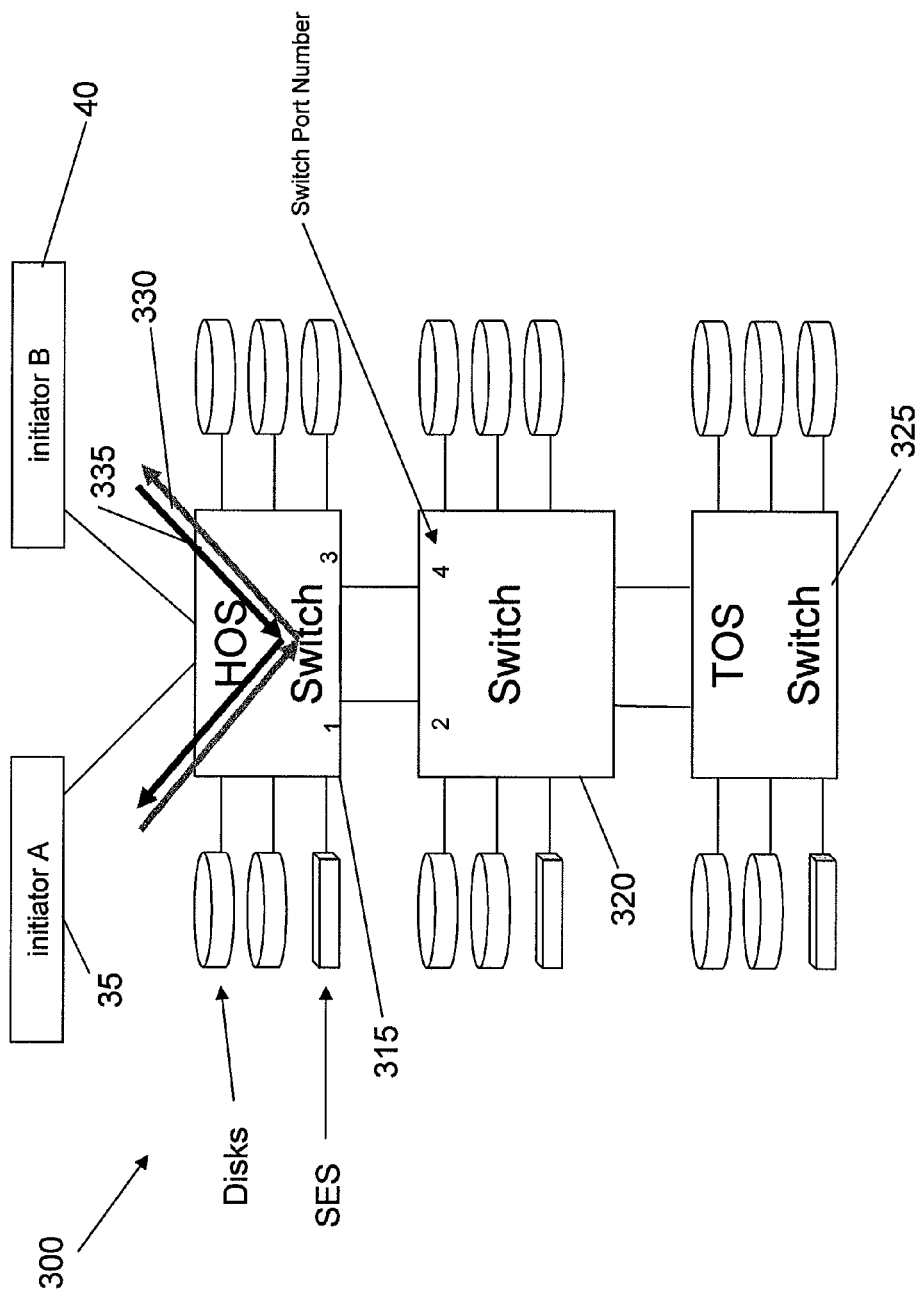
FIG. 3 shows an exemplary switched FCAL network topology illustrating a limited initiator-to-initiator message function.

FIG. 3 shows an exemplary switched FCAL network topology 300 showing a limited initiator-to-initiator message function. As shown in FIG. 3, the exemplary switched FCAL network topology 300 includes an initiator A 35, an initiator B 40, a head of string (HOS) switch 315, a switch 320 and a tail of string (TOS) switch 325. Each switch may have a number of connected network components, e.g., disks and small computer systems interface (SCSI) enclosure services (SES). While the exemplary switched FCAL network topology 300 is shown as including three switches, it should be understood that the invention contemplates that the exemplary switched FCAL network topology 300 may include any number of switches and/or connected network components.

As described above, in a switched FCAL network, messages, e.g., initiator-to-initiator messages, do not traverse the whole network. That is, the shortest route is taken, which is, for example, one hop into a switch and then to the initiator. Additionally, in a switched FCAL loop topology, messages between initiators take the shortest route and do not traverse the entire network or, for example, all the cascaded switches.

Thus, as shown in FIG. 3, an initiator-to-initiator message 330, 335 is sent by initiator A 35 to initiator B 40 and back again to initiator A 35. However, the initiator-to-initiator message 330, 335 takes the shortest route possible. That is, the initiator-to-initiator message 330, 335 only travels the shortest-route from initiator A 35 to initiator B 40 through HOS switch 315, and does not traverse switch 320 and tail of string TOS switch 325. Thus, this shortest-route approach to initiator-to-initiator message implementation, limits a function of the initiator-to-initiator message capability. That is, the initiator-to-initiator message 330, 335 does not traverse the switch 320 or TOS switch 325. Thus, with the shortest-route approach, proper operation of switch 320 or TOS switch 325 (or connected components) is not verifiable.

Enforced Routing

Figure 4:
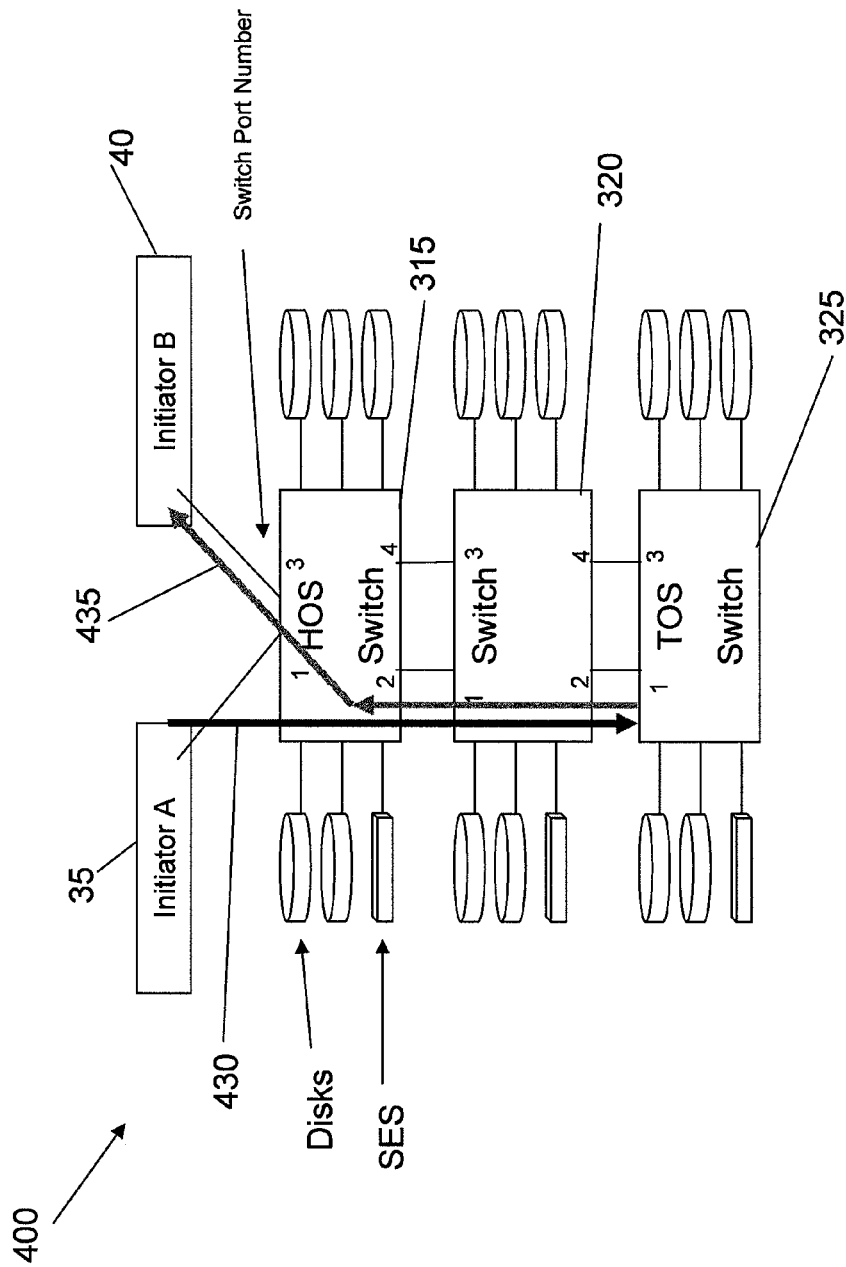
FIG. 4 shows an exemplary switched FCAL network topology utilizing an enforced routing in accordance with aspects of the present invention.

FIG. 4 shows an exemplary switched FCAL network topology 400 utilizing an enforced routing in accordance with aspects of the present invention. As shown in FIG. 4, the routing tool 30 has configured initiator A 35 to transmit an initiator-to-initiator message 430, 435 that traverses each switch of the network. That is, the initiator-to-initiator message 430, 435 traverses HOS switch 315, switch 320 and TOS switch 325. As such, the FIG. 4 shows a potential routing solution that allows the messages between initiator A 35 and initiator B 40 to, for example, test functionality of all switches in a network. It should be understood that the above potential routing solution is based on one theoretical routing path that could be taken, and the invention contemplates that other paths may be designated depending upon implementation specific requirements, as discussed further below.

By the routing tool 30 designating a specific route within the network into verification mode, the initiator can send multiple messages to the partner initiator to stress the underlying network paths of the specific route, and hence, for example, detect any errors. Moreover, in accordance with aspects of the present invention, the routing tool 30 may tune the traffic between the two initiators to use many different I/O patterns, such that, for example, the sensitivity of the transport layer can be exposed.

As discussed above, implementing the present invention allows verification of the underlying network without having to risk sending customer I/O on these paths. Moreover, in accordance with aspects of the present invention, the routing tool 30 may measure the quality of the network for a given amount of traffic between the initiators. Furthermore, the routing tool 30 is operable to determine a confidence factor for an FRU replacement, as discussed further below.

Referring again to FIG. 4, in accordance with aspects of the invention, the switch is forced to perform defined routing for any traffic sent from one initiator and destined for the other initiator. Specifically, the routing tool 30 is operable to send an initial open (OPN) signal along the link from initiator A 35 to initiator B 40, which is received by the HOS switch 315 on port one. However, instead of being routed out of port three (as shown in FIG. 3), the routing tool 30 may route the initiator-to-initiator message to the next switch 320 out of port two of HOS switch 315.

Moreover, in accordance with aspects of the invention, each switch in the cascade will follow the same routing rules until the last switch, e.g., TOS switch 325, is reached. Furthermore, the last switch, e.g., TOS switch 325, will route the initiator-to-initiator message 430, 435 back up through each switch. In embodiments, this can be done via subtractive routing or by routing tables, which, for example, would route the initiator-to-initiator traffic out of port one to port two of the upstream switch. This continues until the first switch, HOS switch 315, is reached where the initiator-to-initiator traffic is routed out of port three to the destination initiator B 40.

Communication between devices in an FC network use different elements of Fiber Channel standards. In addition to the transfer of data, it may be necessary for Fibre Channel communication to include some meta-data. In embodiments, this meta-data allows for the setting up of links, sequence management, and other control functions. The meta-data falls into two types: (1) primitives which comprise a four character transmission word; and (2) non-data frames which may be more complex structures. The FC protocol transmits data in frames each of which may contain, for example, up to 2112 bytes of payload data. In addition to data frames, there are non-data frames that are used for setup and messaging purposes. These fall into three categories, link control frames, link service frames, and extended link service frames.

Additionally, each device, e.g., disk and/or SES in a FCAL has an Arbitrated Loop Physical Address (ALPA). These ALPAs have been designated amongst the fabric, FCAL ports, and other special purposes. Additionally, in a dynamic system, the initiators may be configured to change ports or ALPAs or both. Moreover, with switched FCAL (and other switched technologies), there are standard frames that may only be sent from the initiators during the initialization phases. According to an aspect of the invention, the routing tool 30 may use these frames, e.g., port login frames (PLOGIs), to determine, for example, the initiators' ports and/or their ALPAs.

Thus, in accordance with aspects of the present invention, the routing tool 30 may configure an initiator to specify ports and/or ALPAs, such that an initiator-to-initiator message traverses the specified ports and/or the ALPAs. That is, the routing tool 30 configures the initiator-to-initiator traffic, such that the initiator-to-initiator traffic is forced to traverse identified links in a switched network. As such, in embodiments, the routing tool 30 may define and/or enforce the path or route that the initiator-to-initiator message traverses through the switched FCAL network.

Additionally, in accordance with aspects of the present invention, the routing tool 30 is aware of implicit logouts (e.g., in FCAL terms, where the same OPN signal is received on a port that it was sent from). With the present invention, an implicit logout may be seen in all switches for every message. That is, as shown in FIG. 4, for example, port one of HOS switch 315 receives the "return" leg 435 of the same initiator-to-initiator signal that the port one of HOS switch 315 sent (i.e., "send" leg 430). Thus, the routing tool 30 may be configured to disregard the implicit logout, if the implicit logout relates to initiator-to-initiator messages.

However, for example, if a switch sees an OPN signal more than twice then, in embodiments, a number of enterprise resource planning (ERP) steps could be taken. These steps may be determined, for example, by the implementer's desired goals (e.g., the switch could provide loop initialization (LIP) or return the OPN signal back to the message sender (i.e., the originator of the OPN signal).

FRU Replacement Verification

According to further aspects of the present invention, the routing tool 30 may provide a verification mode entered post-FRU replacement, which allows confidence to be gained in the validity of the service action undertaken. The routing tool 30 provides for the verification of both the actual FRU as being a good replacement, and verification that the original problem no longer exists.

More specifically, using the routing tool 30 as discussed above, it is possible to force an initiator-to-initiator message to traverse a specific network path. Thus, the routing tool 30 may be used to detect any problems in any links in the network. Moreover, in accordance with aspects of the invention, the routing tool 30 may be used to verify an FRU replacement.

Figure 5:
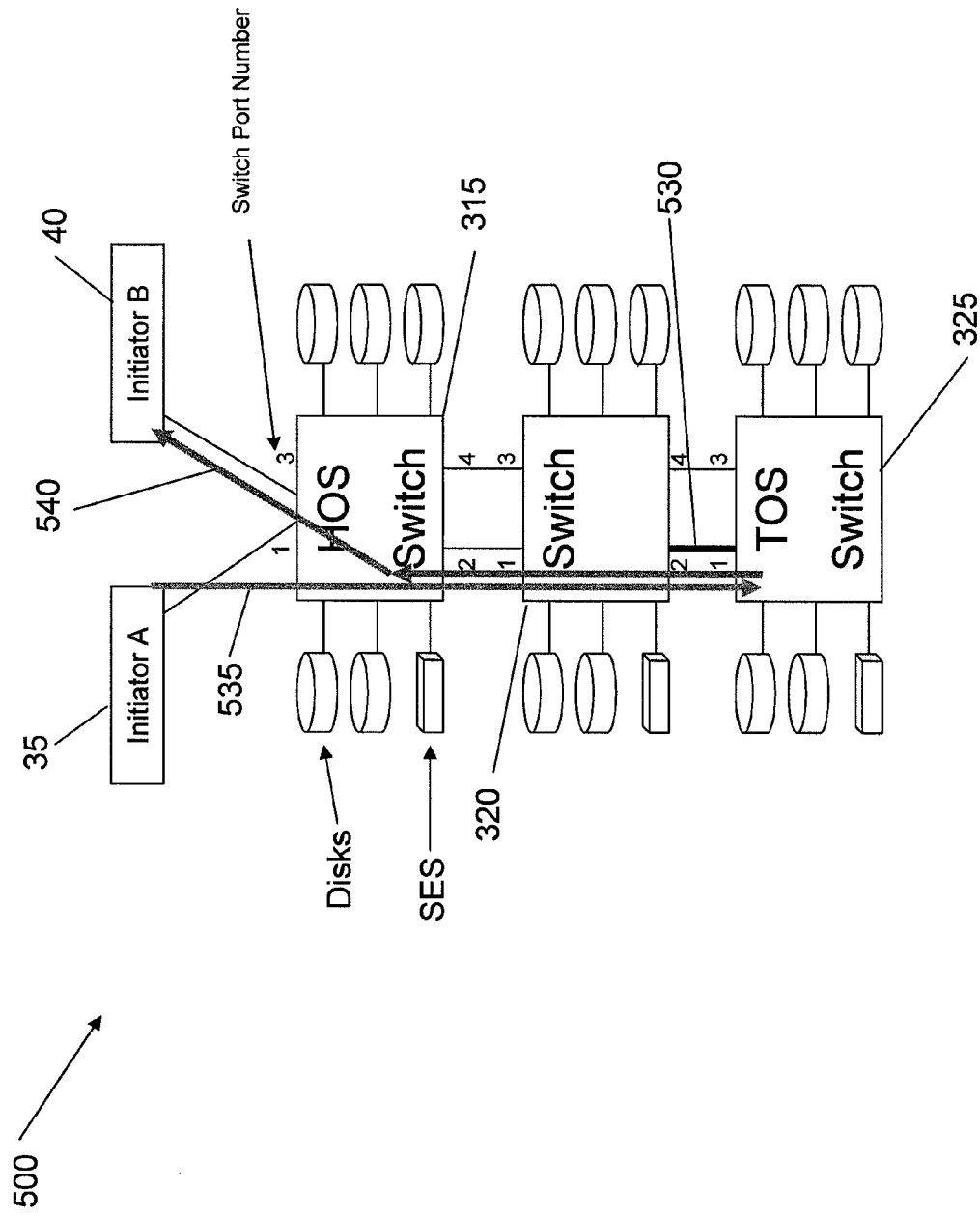
FIG. 5 shows an exemplary switched FCAL network in which an FRU replacement has taken place in accordance with aspects of the present invention.

FIG. 5 shows an exemplary switched FCAL network 500 in which an FRU replacement has taken place. More specifically, a cable connecting port two of switch 320 with port one of TOS switch 325 has been replaced with a replacement cable 530. However, replacement of cable with a replacement cable may not necessarily solve the problem of the network. That is, for example, it may be the case that the original cable was not the cause of the problem. Additionally, it may be the case that the original cable was only a portion of the problem. Furthermore, the replacement cable 530 may itself not function properly. As such, subsequent to an FRU replacement, a verification of both the actual FRU as being a good replacement, and verification that the original problem no longer exists should be performed to ensure a proper FRU replacement solution.

In accordance with aspects of the invention, in order to verify an FRU replacement, the routing tool 30 may configure, for example, initiator A 35 to send an initiator-to-initiator message 535, 540 to initiator B 40. Moreover, the routing tool 30 specifically configures the path or route of the initiator-to-initiator message 535, 540 using, for example, port designations and/or ALPAs as discussed above, such that the initiator-to-initiator message 535, 540 traverses the replacement cable 530.

Thus, as shown in FIG. 5, the routing tool 30 has configured the initiator-to-initiator verification traffic during a verification mode such that an outbound leg 535 the initiator-to-initiator message 535, 540 (which comprises outbound leg 535 and inbound leg 540) is sent by initiator A 35 into port one of HOS switch 315 and out of port two of HOS switch 315. From there, the outbound leg of the initiator-to-initiator message 535, 540 is routed into port one of switch 320 and out port two of switch 320. Additionally, as shown in FIG. 5, the outbound leg 535 of the initiator-to-initiator message 535, 540 is routed into port one of TOS switch 325 and then the inbound leg 540 of the initiator-to-initiator message 535, 540 is sent back out of port one of TOS switch 325. Furthermore, the inbound leg 540 of the initiator-to-initiator message 535, 540 is routed into port two of switch 320 and out of port one of switch 520. Lastly, the inbound leg 540 of the initiator-to-initiator message 535, 540 is routed into port two of HOS switch 315 and out of port three to initiator B 40.

Moreover, by the routing tool 30 configuring the initiator-to-initiator verification traffic during a verification mode as shown in the example of FIG. 5, both the outbound leg 535 and the inbound leg 540 of the initiator-to-initiator message 535, 540 is forced to traverse the replaced FRU, e.g., the replaced cable 530. Thus, in accordance with aspects of the invention, the initiator-to-initiator message 535, 540 is operable to verify the FRU replacement. That is, the initiator-to-initiator message 535, 540 can verify both that the actual FRU is a good replacement and that the original problem, e.g., caused by the replaced FRU, no longer exists.

It should be understood that the FRU replacement location may be at other locations than that shown in FIG. 5. For example, the routing tool 30 may configure an initiator to send an initiator-to-initiator message down a route such that proper operation of, e.g., a replaced cable between the SES and HOS switch 315 may be verified.

Figure 6:
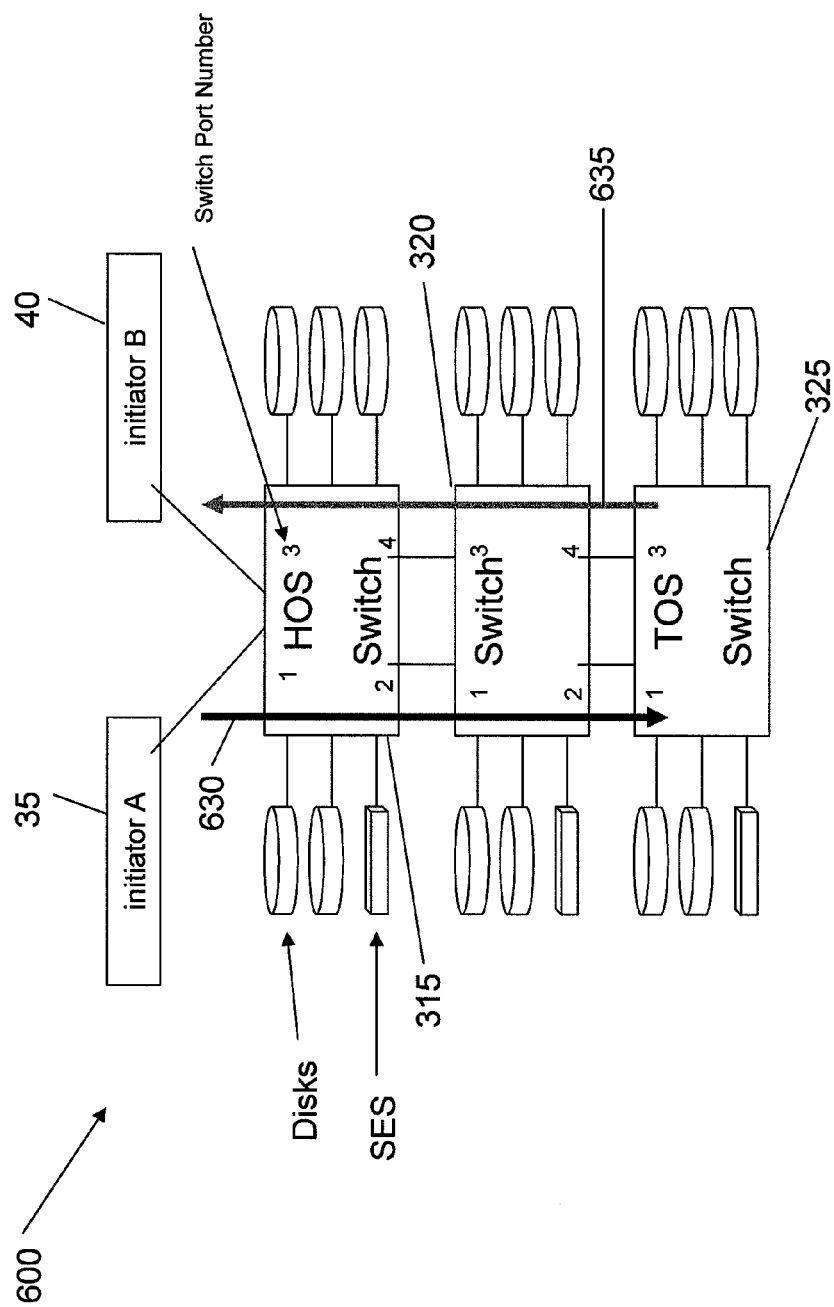
FIGS. 6 and 7 show exemplary alternative enforced routings in accordance with aspects of the invention.

FIG. 6 shows an exemplary alternative routing 600 in accordance with aspects of the invention, which the routing tool 30 may enforce to, for example, verify an FRU replacement at other locations in the switched FCAL network. More specifically, with the exemplary alternative routing 600, the routing tool 30 has configured initiator A 35 to transmit an "outbound" leg 630 of the initiator-to-initiator message 630, 635 down a similar path as that shown in FIG. 5. However, in contrast to the enforced route of FIG. 5, the "inbound" leg 635 of the initiator-to-initiator message 630, 635 is routed through ports three and four of TOS switch 325 and switch 320, respectively, and port four of the HOS switch 315.

Figure 7:
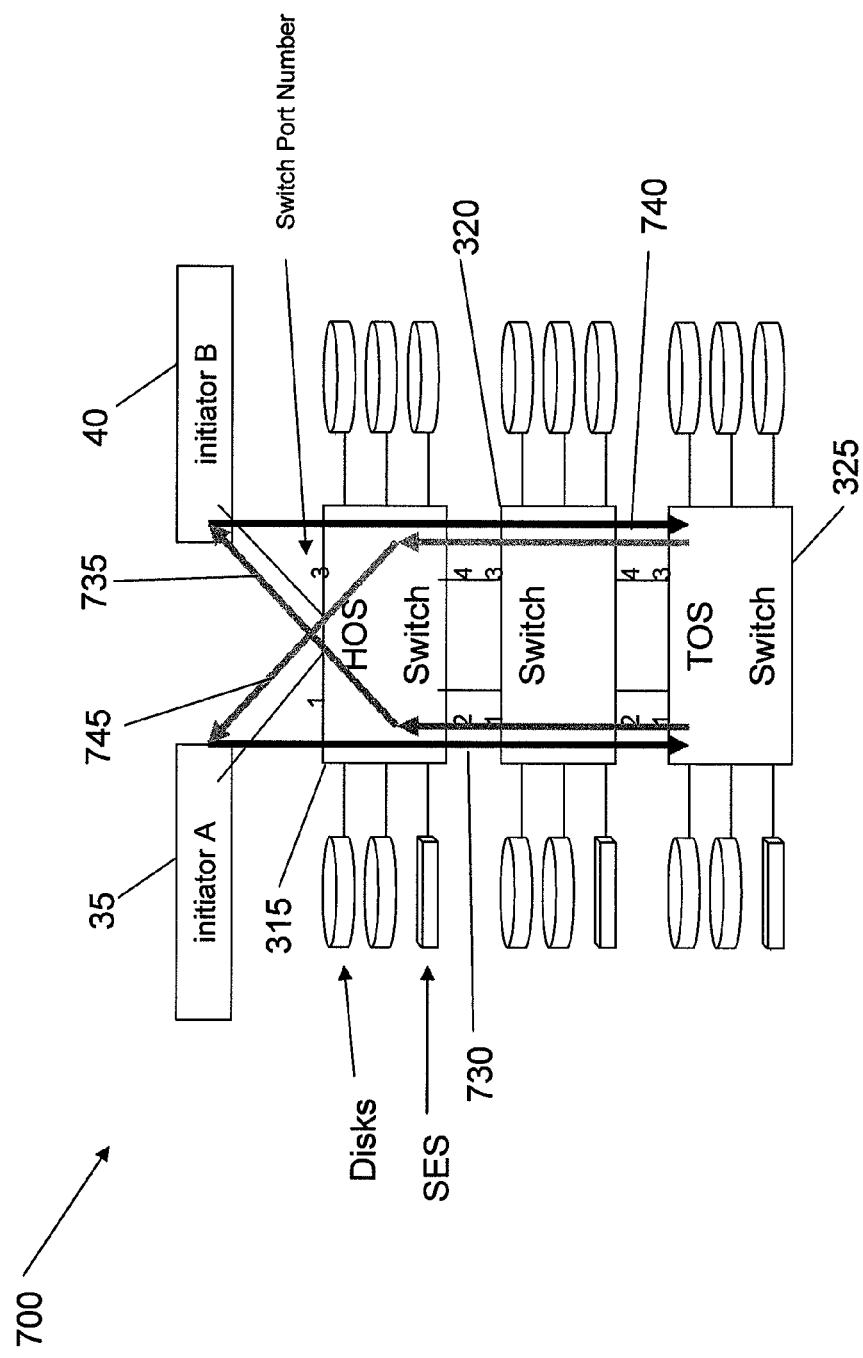

FIG. 7 shows an exemplary alternative routing 700 in accordance with aspects of the invention, which the routing tool 30 may enforce to, for example, verify an FRU replacement at other locations in the switched FCAL network. More specifically, in embodiments, with the exemplary alternative routing 700, the routing tool 30 has configured both initiator A 35 and initiator B 40 to send initiator-to-initiator messages. That is, as shown in FIG. 7, initiator A 35 has been configured to send an initiator-to-initiator message 730, 735 (comprising out bound leg 730 and inbound leg 735). Additionally, initiator B 40 has been configured to send an initiator-to-initiator message 740, 745 (comprising outbound leg 740 and inbound leg 745). Moreover, while these respective initiator-to-initiator messages are shown as symmetrical in FIG. 7, it should be understood that the routing tool 30 may configure the initiator-to-initiator messages to traverse any prescribed path in the switched FCAL network.

Flow Diagram

Figure 8:
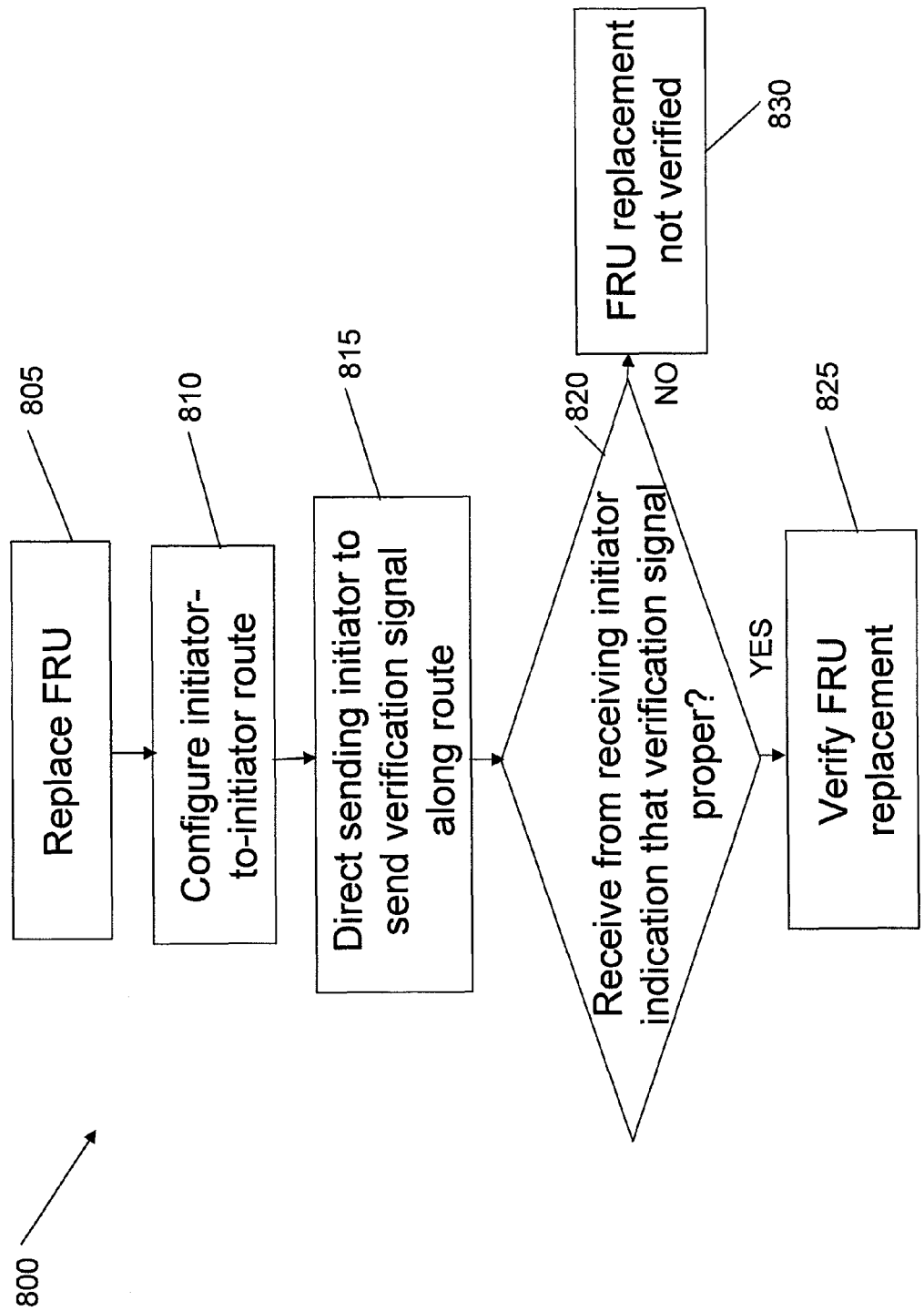
FIG. 8 shows an exemplary flow for practicing aspects of the present invention.

FIG. 8 show an exemplary flow for performing aspects of the present invention. The steps of FIG. 8 may be implemented in the environment of FIG. 1, for example. The flow diagram may equally represent a high-level block diagram of the invention. The flowchart and/or block diagram in FIG. 8 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

As shown in the exemplary flow 800 of FIG. 8, at step 805 a user, e.g., a service technician replaces an FRU that is in need of replacement. At step 810, the routing tool configures a route for the initiator-to-initiator message, such that the replaced FRU is traversed by the initiator-to-initiator message. At step 815, the routing tool instructs a sending initiator to send a initiator-to-initiator verification signal along the configured route. At step 820, a determination is made as to whether the routing tool received from the receiving initiator an indication that the verification signal was properly received by the receiving initiator. If, at step 820, it is determined that the routing tool received from the receiving initiator an indication that the verification signal was properly received by the receiving initiator, at step 825, the routing tool verifies the FRU replacement. If, at step 820, it is determined that the routing tool did not receive from the receiving initiator an indication that the verification signal was properly received by the receiving initiator, the routing tool does not verify the FRU replacement.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable medium having programming instructions operable to:
   configure an initiator-to-initiator message route in a switched fibre channel arbitrated loop (FCAL) network such that the initiator-to-initiator message route traverses a replacement field replaceable unit (FRU); and
   transmit a verification initiator-to-initiator message along the initiator-to-initiator message route to verify proper operation of the replacement FRU.

2. The method of claim 1, wherein the programming instructions are further operable to output a signal indicative of a proper operation of the replacement FRU or an improper operation of the replacement FRU.

3. The method of claim 1, wherein the verifying the proper operation of the replacement FRU occurs without sending customer input/output (I/O) data on the initiator-to-initiator message route.

4. The method of claim 1, wherein:
   the configuring the initiator-to-initiator message route comprises: a sending initiator defining and enforcing a particular route in the switched FCAL network for the initiator-to-initiator message to travel while at the same time traversing the replacement FRU even when the replacement FRU is located on a route other than a shortest route possible between the sending initiator and a receiving initiator; and
   the verification initiator-to-initiator message is transmitted from the sending initiator to the receiving initiator along the particular route.

5. A method implemented in a computer infrastructure having computer executable code tangibly embodied on a computer readable medium having programming instructions operable to:
   configure an initiator-to-initiator message route in a switched fibre channel arbitrated loop (FCAL) network such that the initiator-to-initiator message route traverses a replacement field replaceable unit (FRU); and
   transmit a verification initiator-to-initiator message along the initiator-to-initiator message route to verify proper operation of the replacement FRU, wherein:
   the verification initiator-to-initiator message is transmitted from a sending initiator to a receiving initiator; and the programming instructions are further operable to measure a quality of the switched FCAL network for a given amount of traffic between the sending initiator and the receiving initiator.

6. The method of claim 1, wherein the programming instructions are further operable to determine a confidence factor for the replacement FRU.

7. The method of claim 1, wherein the configuring the initiator-to-initiator message route further comprises designating at least one of a port and an arbitrated loop physical address (ALPA) to be traversed by the initiator-to-initiator message route.

8. The method of claim 1, wherein the programming instructions are further operable to ignore implicit logouts for initiator-to-initiator messages.

9. The method of claim 1, wherein the verifying the proper operation of the replaced FRU comprises at least one of verifying:
   the replacement FRU is a properly functioning component; and
   an original problem, which provoked an FRU replacement, no longer exists.

10. The method of claim 1, wherein the verifying the proper operation of the replacement FRU occurs without placing an entirety of the switched FCAL network into a logical service mode.

11. The method of claim 1, wherein the switched FCAL network is configured as a switched FCAL disk storage network.

12. The method of claim 1, wherein a service provider at least one of creates, maintains, deploys and supports the computer infrastructure that performs the steps of claim 1.

13. The method of claim 1, wherein steps of claim 1 are provided by a service provider on a subscription, advertising, and/or fee basis.

14. A system, comprising:
   a routing tool operable to:
      configure an initiator-to-initiator message route in a switched fibre channel arbitrated loop (FCAL) network such that the initiator-to-initiator message route traverses a replacement field replaceable unit (FRU); and
      instruct an initiator to transmit a verification initiator-to-initiator message along the initiator-to-initiator message route to verify proper operation of the replacement FRU.

15. The system of claim 14, wherein the routing tool is further operable to output a signal indicative of a proper operation of the replacement FRU or an improper operation of the replacement FRU.

16. The system of claim 14, wherein the routing tool is further operable to verify the proper operation of the replacement FRU without at least one of:
   sending customer input/output (I/O) data on the initiator-to-initiator message route; and
   placing an entirety of the switched FCAL network into a logical service mode.

17. The system of claim 14, wherein the routing tool is further operable to at least one of:
   measure a quality of the switched FCAL network for a given amount of traffic between a sending initiator and a receiving initiator; and
   determine a confidence factor for the replacement FRU.

18. The system of claim 14, wherein the routing tool is further operable to configure the initiator-to-initiator message route by designating at least one of a port and an arbitrated loop physical address (ALPA) to be traversed by the initiator-to-initiator message route.

19. A computer program product comprising a computer usable medium having readable program code embodied in the medium, the computer program product includes at least one component operable to:
   configure an initiator-to-initiator message route in a switched fibre channel arbitrated loop (FCAL) network such that the initiator-to-initiator message route traverses a replacement field replaceable unit (FRU);
   transmit a verification initiator-to-initiator message along the initiator-to-initiator message route to verify proper operation of the replacement FRU; and
   output a signal indicative of at least one of proper operation of the replacement FRU and improper operation of the replacement FRU.

20. A method comprising:
providing a computer infrastructure operable to:
   configure an initiator-to-initiator message route in a switched fibre channel arbitrated loop (FCAL) network such that the initiator-to-initiator message route traverses a replacement field replaceable unit (FRU); and
   transmit a verification initiator-to-initiator message along the initiator-to-initiator message route to verify proper operation of the replacement FRU.

* * * * *